S. NEILL.
Revolving Harrow.
No. 29,903.
Patented Sept. 4, 1860.
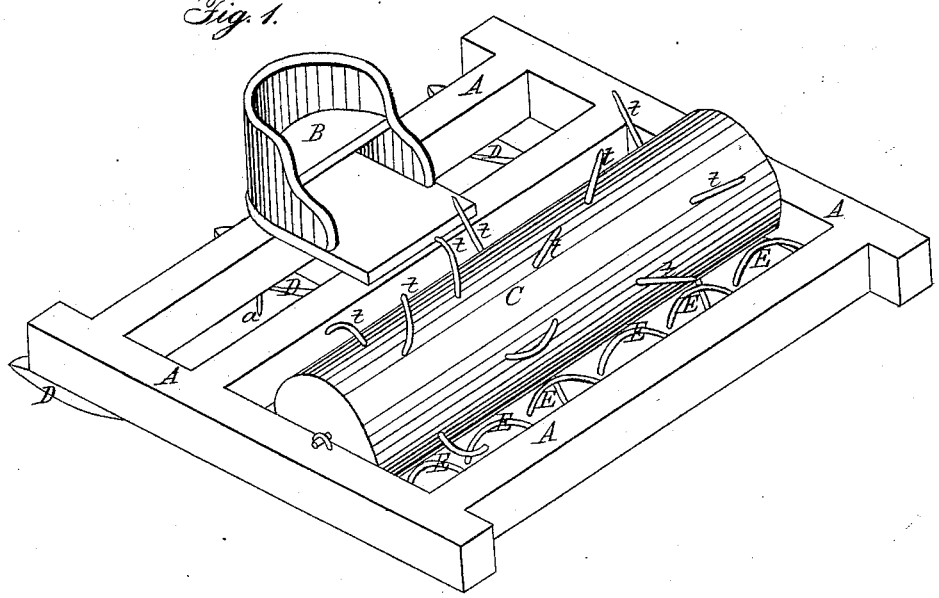
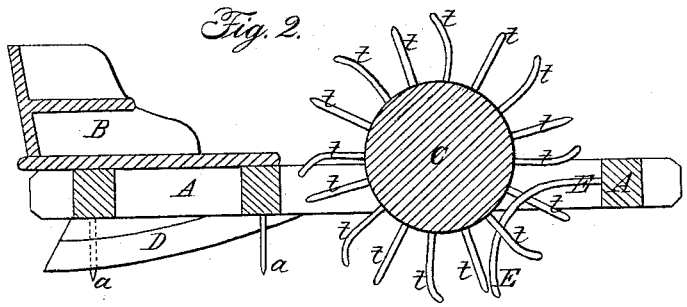
Witnesses:
F. W. Howard
J. M. Wampler
Inventor:
Stewart Neill
by his attorney
Chas. F. Stansbury

UNITED STATES PATENT OFFICE.

STEWART NEILL, OF CHILLICOTHE, ILLINOIS.

IMPROVEMENT IN HARROWS.

Specification forming part of Letters Patent No. 29,903, dated September 4, 1860.

*To all whom it may concern:*

Be it known that I, STEWART NEILL, of Chillicothe, in the county of Peoria and State of Illinois, have invented an Improved Harrow; and I do hereby declare the following to be a correct description of the same, reference being had to the accompanying drawings, in which—

Figure 1 is an isometrical perspective view of my improved harrow, and Fig. 2 is a central vertical section of the same from front to rear.

The same part is marked by the same letter of reference in both figures.

The nature of my invention consists in the arrangement and combination of parts hereinafter described, forming a harrow in which the weight is thrown onto the revolving cylinder, thus rendering it easy of draft, and by which the soil is pulverized between the fixed and revolving teeth and the ground marked off for planting by the markers, all as hereinafter more fully set forth.

To enable others to make and use my improved harrow, I will proceed to describe its construction and operation.

A in the drawings marks the frame of the harrow, which is made of wood and in the usual form. The rear cross-rails are provided with the ordinary harrow-teeth, $a$ $a$, arranged in the common way. Upon these rails is placed the driver's seat B. Hung in suitable bearings on the main frame is the cylindrical roller C, provided with teeth $t$, which may be either straight or curved. Underneath the rear cross-rails are attached three or any desired number of markers, D, of the shape shown, which mark off the ground for planting. To the front cross-rail are attached curved teeth E, between which the teeth $t$ of cylinder C pass as said cylinder revolves.

As the harrow is drawn forward all large clods of earth will be broken up in their passage between the teeth E by the teeth $t$. The soil will then be thoroughly harrowed by the teeth $t$ and $a$, and when thus prepared will be laid off in parallel lines for planting by the markers D.

Having thus fully described my invention, what I claim, and desire to secure by Letters Patent, is—

The combination and arrangement of the teeth E, toothed roller C, and markers D, substantially in the manner specified and shown.

The above specification signed and witnessed.

STEWART NEILL.

Witnesses:
JOHN C. FOLLIOTT,
R. S. GROSH